(12) United States Patent
Ishikawa et al.

(10) Patent No.: US 11,914,270 B2
(45) Date of Patent: Feb. 27, 2024

(54) ELECTRONIC APPARATUS AND SLIDE MECHANISM

(71) Applicant: LENOVO (SINGAPORE) PTE. LTD., Singapore (SG)

(72) Inventors: Keita Ishikawa, Yokohama (JP); Masato Itoh, Yokohama (JP); Tabito Miyamoto, Yokohama (JP); Takehito Yamauchi, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 214 days.

(21) Appl. No.: 17/647,637

(22) Filed: Jan. 11, 2022

(65) Prior Publication Data

US 2023/0004068 A1   Jan. 5, 2023

(30) Foreign Application Priority Data

Jul. 1, 2021   (JP) .................................. 2021109830

(51) Int. Cl.
  *G03B 11/04*  (2021.01)
  *H04M 1/02*  (2006.01)
  *G06F 1/16*  (2006.01)

(52) U.S. Cl.
  CPC .......... *G03B 11/041* (2013.01); *G03B 11/043* (2013.01); *G06F 1/1605* (2013.01); *G06F 1/1637* (2013.01); *G06F 1/1686* (2013.01); *H04M 1/0264* (2013.01)

(58) Field of Classification Search
  None
  See application file for complete search history.

(56) References Cited

U.S. PATENT DOCUMENTS

| 2008/0174392 | A1* | 7/2008 | Cho | H04M 1/0237 335/306 |
| 2008/0182634 | A1* | 7/2008 | Cho | H04M 1/0237 455/575.4 |
| 2009/0146537 | A1* | 6/2009 | Wang | H04M 1/0237 312/334.1 |
| 2010/0067833 | A1* | 3/2010 | Jin | H04M 1/0237 384/8 |

(Continued)

FOREIGN PATENT DOCUMENTS

| CN | 108769324 A | * 11/2018 | .......... H04M 1/0237 |
| CN | 111182092 A | * 5/2020 | .......... H04M 1/0235 |

(Continued)

*Primary Examiner* — Rodney E Fuller
(74) *Attorney, Agent, or Firm* — SHIMOKAJI IP (57) ABSTRACT

A slide mechanism includes: a slider that is movable between a first position and a second position along an edge wall; a shield cover on the slider, the shield cover being located to cover the front of the camera when the slider is in the first position and located to be away from the front of the camera when the slider is in the second position; a movable magnet at the slider; and a fixed magnet at the chassis. The movable magnet and the fixed magnet are disposed to face each other so that when the slider is in the first position and the second position, the movable magnet and the fixed magnet attract to each other, and when the slider is located between the first position and the second position, the movable magnet and the fixed magnet repel each other.

8 Claims, 11 Drawing Sheets

(56) References Cited

U.S. PATENT DOCUMENTS

| | | | | |
|---|---|---|---|---|
| 2011/0182029 A1* | 7/2011 | Wu | ................. | G06F 1/1616 |
| | | | | 361/679.55 |
| 2021/0333686 A1* | 10/2021 | Park | ................. | G03B 11/041 |
| 2022/0269149 A1* | 8/2022 | Stone | ................. | G03B 30/00 |
| 2022/0377216 A1* | 11/2022 | Lin | ................. | G06F 1/1686 |

FOREIGN PATENT DOCUMENTS

| | | | | |
|---|---|---|---|---|
| CN | 111200675 A | * | 5/2020 | ........ H04M 1/0235 |
| CN | 111953819 A | * | 11/2020 | |
| JP | 2020201886 A | | 12/2020 | |

\* cited by examiner

ELECTRONIC APPARATUS AND SLIDE MECHANISM

TECHNICAL FIELD

The present disclosure relates to an electronic apparatus and a slide mechanism.

BACKGROUND

Many electronic apparatuses, such as a laptop personal computer (laptop PC), a tablet computer (tablet PC), and a multifunctional mobile phone (smartphone), have optical devices such as a camera around the display.

SUMMARY

An electronic apparatus according to one aspect of the present disclosure includes: a chassis having a display; an optical device disposed in the chassis to direct forward; a slider that is movable between a first position and a second position relative to the chassis; a shield cover in the slider, the shield cover being located to cover the front of the optical device when the slider is in the first position and located to be away from the front of the optical device when the slider is in the second position; a movable magnet at the slider; and a fixed magnet at the chassis. The movable magnet and the fixed magnet are disposed to face each other so that when the slider is in the first position and the second position, the movable magnet and the fixed magnet attract to each other, and when the slider is located between the first position and the second position, the movable magnet and the fixed magnet repel each other.

BRIEF DESCRIPTION OF THE DRAWINGS

FIGS. 6A-6B illustrate the movable magnet, the fixed magnet and their peripheral, where FIG. 6A illustrates them when the slider is in the first position, and FIG. 6B illustrates them when the slider is in the second position.

DETAILED DESCRIPTION

The following describes an electronic apparatus and a slide mechanism according to one embodiment of the present disclosure in details, with reference to the drawings. The present disclosure is not limited to the following embodiment.

A camera on a display chassis is typically directed to a user, and the user may feel uneasy because the camera may capture images of them contrary to their intention even when the camera does not operate. When the camera is exposed, this may degrade the design integrity with the frame. As one means of covering the camera, a manually slidable mechanical shutter including a shield cover can be used.

Recently, electronic apparatuses have been required to have a frame, which surrounds the display, as narrow as possible for thinner and lighter in weight. Further miniaturization also is required for the mechanism for sliding of the shield cover, which may reduce the click feeling to the user.

In view of the above, it would be desirable to provide an electronic apparatus and a slide mechanism that are easy to assemble, provide a stable click feeling, and achieve a long lifespan.

Figure 1:
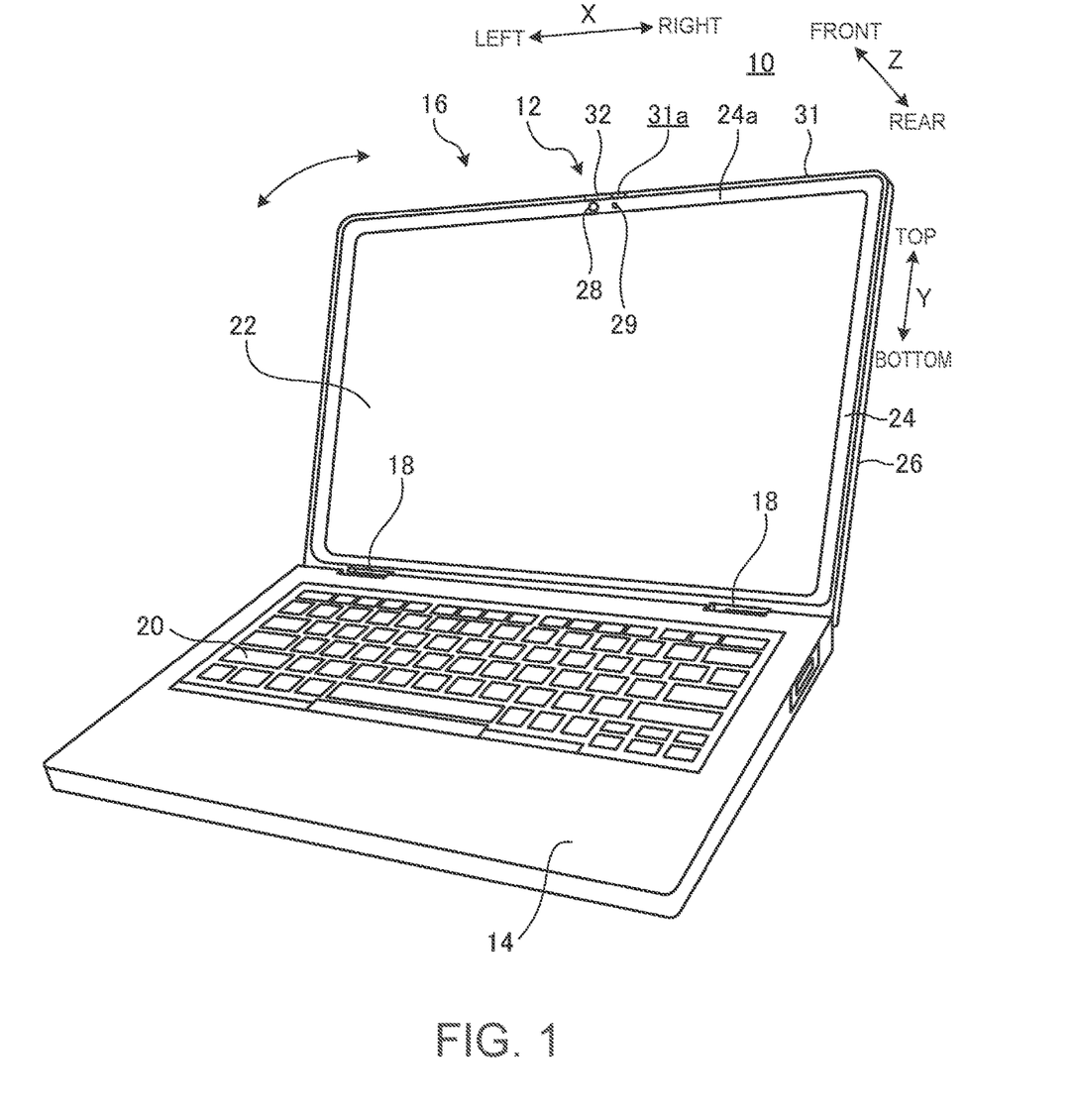
FIG. 1 is a perspective view of an electronic apparatus according to one embodiment of the present disclosure.

FIG. 1 is a perspective view of an electronic apparatus 10 according to one embodiment of the present disclosure. The electronic apparatus 10 includes a slide mechanism 12 according to one embodiment of the present disclosure. The electronic apparatus 10 is a laptop PC. The electronic apparatus according to the present disclosure is not limited to a laptop PC, which may be a desktop PC, a mobile tablet terminal, or a multifunctional mobile phone.

The electronic apparatus 10 includes a body chassis 14 and a display chassis 16 that is openable/closable relative to the body chassis 14 via hinges 18. The laptop PC with the display chassis 16 closed is compact and is suitable for mobile use. The upper face of the body chassis 14 comes with a keyboard 20.

The following may refer to the left-right direction of the display chassis 16 as X direction, the upper-lower direction as Y direction, and the thickness direction of a display 22 as Z direction. For the display chassis 16, lower refers to the side connecting to the body chassis 14 via the hinges 18, and upper refers to the opposite side. X direction is the moving direction of a slider 36 described later. Y direction is the direction orthogonal to the moving direction of the slider 36 described later and the front-rear direction. For Z direction, the front refers to the direction where the front face of the display 22 faces, and the rear refers to the opposite. That is, Z direction is the front-rear direction.

The display chassis 16 includes the display 22 on the front face, i.e., on the display face, a frame (chassis) 24 surrounding the display 22, and a rear cover (chassis) 26. The frame 24 and the rear cover 26 make up a part of the chassis. The rear cover 26 and the frame 24 are made of resin materials. The rear cover 26 has a slightly larger area than the display 22 and covers the rear face of the display 22. The display 22 is a rectangular thin color liquid crystal display, and occupies a major part of the front face of the display chassis 16. The frame 24 is narrow, which may be called a narrow bezel.

Figure 2:
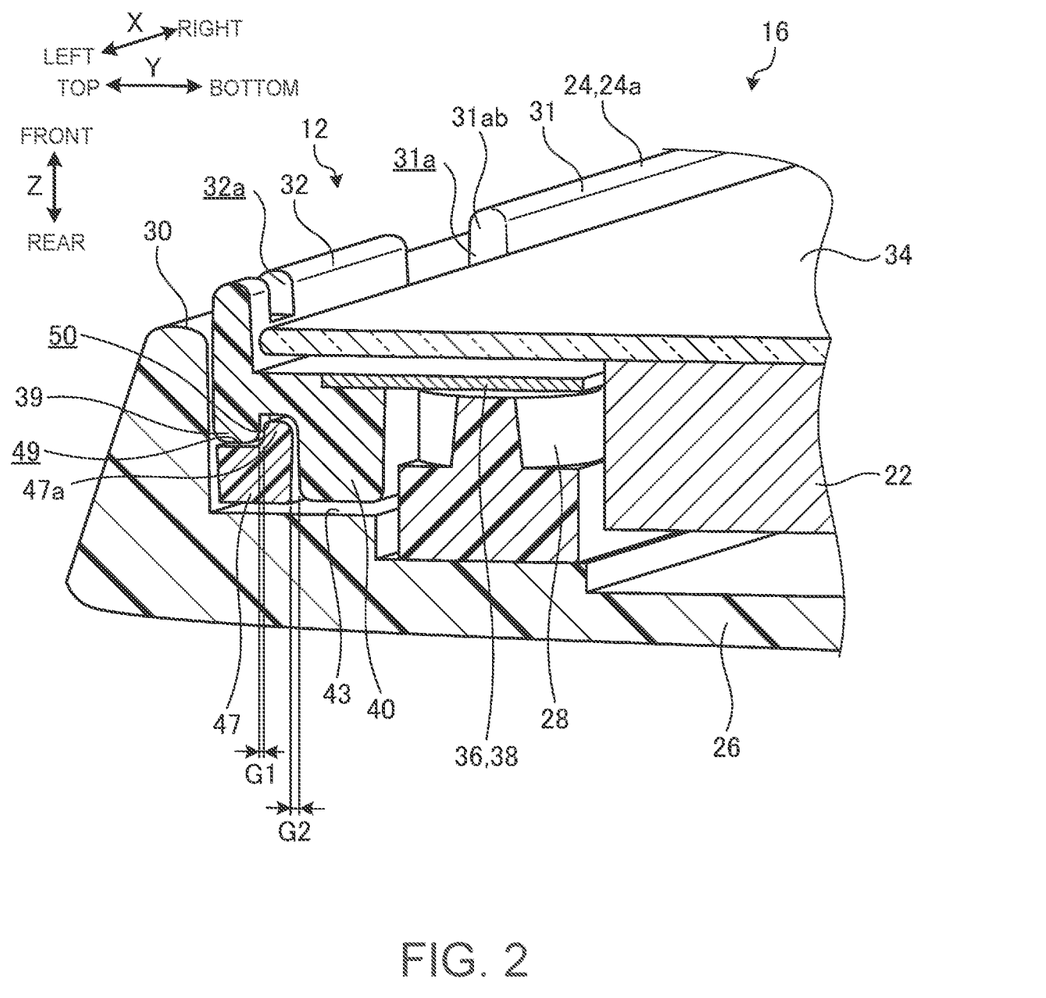
FIG. 2 is a cross-sectional perspective view of an upper portion of the display chassis including a groove.

FIG. 2 is a cross-sectional perspective view of an upper portion of the display chassis 16 including a groove 31a. As illustrated in FIGS. 1 and 2, a camera (optical device) 28 and a camera lamp (optical device) 29 are placed above the rear cover 26 in a position behind an upper frame 24a of the frame 24 so that the camera 28 and the camera lamp 29 face forward.

The display chassis 16 has a glass 34 on the front face. The glass 34 covers the front portion of the display 22 and of the upper frame 24a. The portion of the glass 34 that covers the upper frame 24a is colored in black so that the structure of the upper frame 24a is invisible. The portion of the glass 34 that is located in front of the camera 28 and the camera lamp 29 has no color and serves a transparent window to expose these devices. The camera 28 and the camera lamp 29 may be shielded by a first shield cover 46a and a second shield cover 46b described later. The camera 28 is placed at a substantially center position of the upper frame 24a in the left-right direction. A microphone and an infrared port may be disposed at the upper frame 24a.

A narrow edge wall 30 surrounds the circumference of the rear cover 26. A narrow circumferential wall 31 surrounds almost the entire circumference of the frame 24. The circumferential wall 31 is substantially in contact with the inner circumference of the edge wall 30. The circumferential wall 31 protrudes slightly from the front edge of the edge wall 30.

The circumferential wall 31 has a groove 31a at a substantially center of the upper frame 24a. The groove 31a comes with an operation knob 32. The operation knob 32 is narrower in X direction than the groove 31a. The operation knob 32 and the circumferential wall 31 have the same width in the Y direction. The operation knob 32 protrudes forward from between the edge wall 30 and the glass to the same extent as the circumferential wall 31 protrudes. The operation knob 32 is small enough to fit within the width of the circumferential wall 31 in Y direction and Z direction and be less conspicuous, and is favorable in appearance.

The operation knob 32 is a part of the slider 36 (see FIG. 3) described later, and slides in X direction together with the slider 36. In other words, the slider 36 is movable in X direction relative to the display chassis 16 between a first position and a second position. The operation knob 32 is slidable between the first position (see FIG. 3) and the second position (see FIG. 9) within the width of the groove 31a. The operation knob 32 has a cutout 32a, which allows the user to operate the operation knob 32 easily with a finger or a nail. The cutout 32a is located just above the camera 28 when the slider 36 is in the first position, which enables the user to operate the operation knob 32 intuitively to cover the camera 28.

Figure 3:
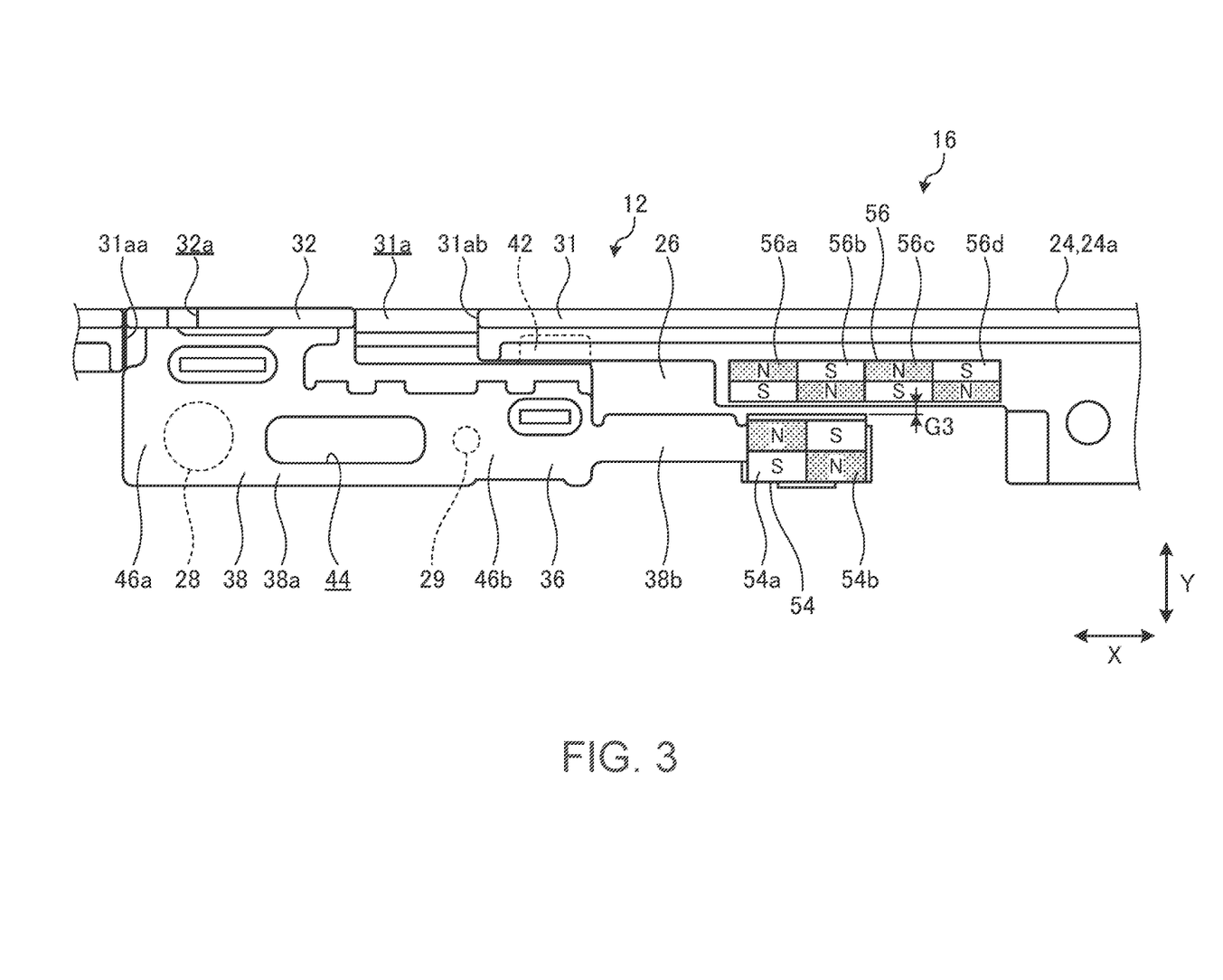
FIG. 3 is an enlarged front view of the upper frame in the display chassis when the slider is in the first position.
Figure 4:
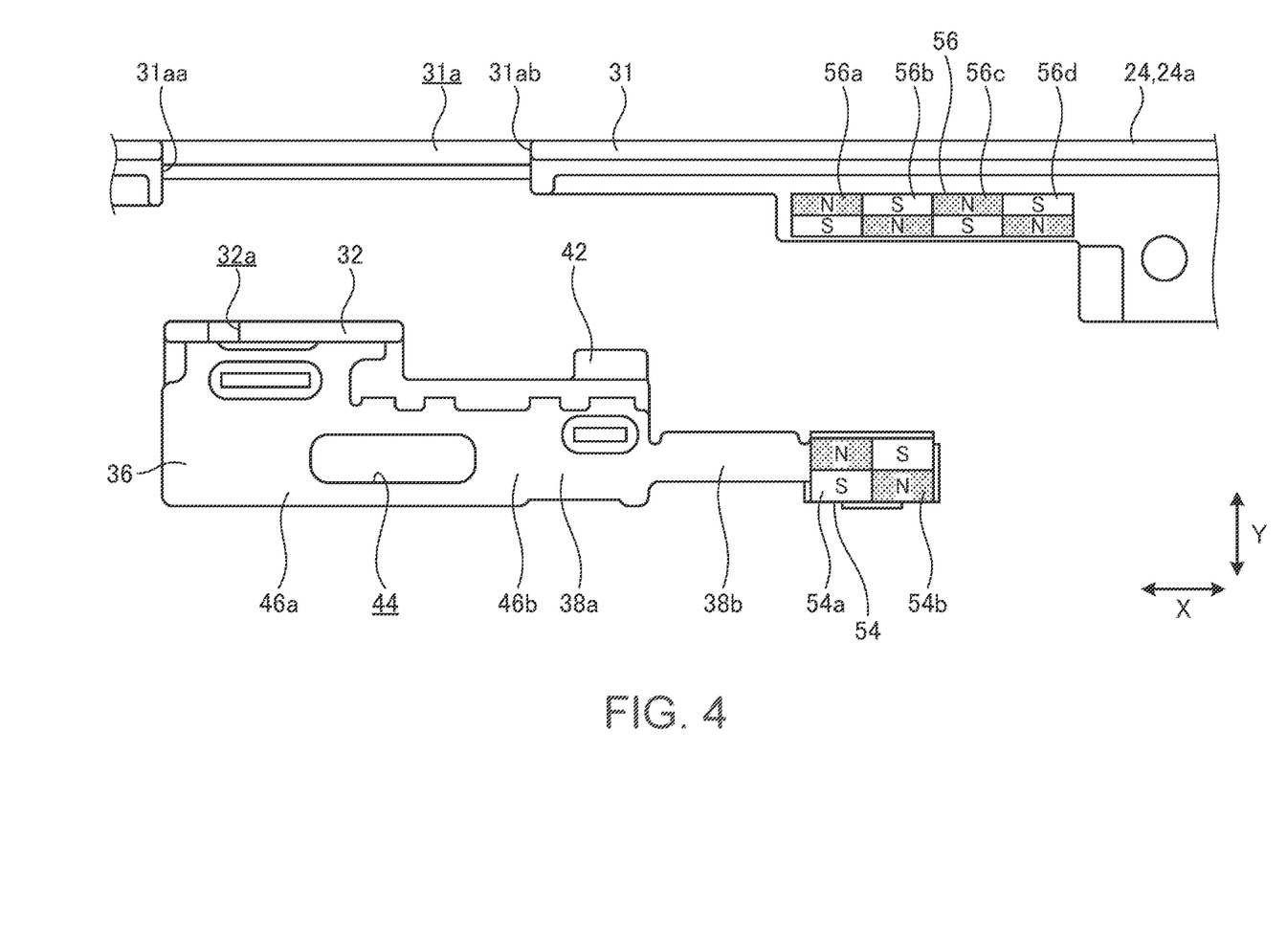
FIG. 4 is an exploded front view of the upper frame and the slider.

FIG. 3 is an enlarged front view of the upper frame 24a in the display chassis 16 when the slider 36 is in the first position. FIG. 3 omits the glass 34 so that the structure of the upper frame 24a is visible. The same goes for FIG. 8 and FIG. 9 described later. FIG. 4 is an exploded front view of the upper frame 24a and the slider 36.

As illustrated in FIG. 3 and FIG. 4, the upper frame 24a comes with the slider 36. The slider 36 is movable in the direction along the edge wall 30 (i.e., in X direction). When the slider 36 moves to the leftmost in the front view, the operation knob 32 abuts a first contact portion 31aa at the left end of the groove 31a to be restricted in movement to the left (see FIG. 3). This position of the slider 36 is referred to as the first position. When the slider 36 is displaced to the rightmost in the front view, the operation knob 32 abuts a second contact portion 31ab at the right end of the groove 31a to be restricted in movement to the right (see FIG. 9). This position of the slider 36 is referred to as the second position.

The slider 36 includes a metal plate 38 as the base. The metal plate 38 is made of a ferrite material. The metal plate 38 has a substantially rectangular main portion 38a on the left and an arm 38b protruding from the lower part of the main portion 38a to the right. The upper left portion of the main portion 38a is integral with the operation knob 32. A first guide protrusion piece 39 (see FIG. 2) and a first slide piece 40 (see FIG. 2) are placed behind the operation knob 32. The upper right portion of the main portion 38a is integral with a second slide piece (see FIG. 5) protruding rearward and a second guide protrusion piece 42 (see FIG. 5) protruding upward from the rear end of the second slide piece 41.

The main portion 38a has a horizontally-long exposure hole 44 in a substantially center. A portion of the main portion 38a on the left of the exposure hole 44 is a first shield cover 46a, and a portion on the right is a second shield cover 46b. When the slider 36 is in the first position (see FIG. 3), the first shield cover 46a is positioned to cover the front of the camera 28 and the second shield cover 46b is positioned to cover the front of the camera lamp 29. When the slider 36 is in the second position (see FIG. 9), the first shield cover 46a is positioned away from the front of the camera 28 and the second shield cover 46b is positioned away from the front of the camera lamp 29. When the slider 36 is in the second position, the camera lamp 29 is exposed through the exposure hole 44.

Referring back to FIG. 2, the first guide protrusion piece 39 protrudes slightly rearward while being continuous with the operation knob 32. The rear cover 26 has a guide pedestal 47 at the corner of the edge wall 30 and the bottom face 43. The guide pedestal 47 has a protrusion piece (rail guide) 47a that slightly protrudes forward from the lower portion. The protrusion piece 47a and the edge wall 30 define a first guide groove 49 therebetween.

The first slide piece 40 is located slightly below the first guide protrusion piece 39 and protrudes rearward in parallel with the first guide protrusion piece 39. The first slide piece 40 abuts and slides on the bottom face 43. The first slide piece 40 has an appropriate width in Y direction, and thus allows the slider 36 to be stably supported and be slidable relative to the rear cover 26. The first guide protrusion piece 39 and the first slide piece 40 define a second guide groove 50 therebetween.

The first guide protrusion piece 39 fits into the first guide groove 49, and the protrusion piece 47a fits into the second guide grove 50. This configuration restricts the displacement of the slider 36 in Y direction and properly guides the slider 36 in X direction during sliding. In this way, the protrusion piece 47a serves as a rail guide that guides the slider 36 in X direction.

Note here that a narrow gap G1 in Y direction is formed between the first guide protrusion piece 39 and the protrusion piece 47a, and a narrow gap G2 in Y direction is formed between the protrusion piece 47a and the first slide piece 40. In this way, the slider 36 is allowed to tilt somewhat (see FIG. 8). When the slider 36 is in the first position or the second position, the slider 36 is biased upward by the attraction action between a movable magnet 54 and a fixed magnet 56, which will be described later, so that no gap is formed between the first guide protrusion piece 39 and the edge wall 30. This gives favorable appearance.

Figure 5:
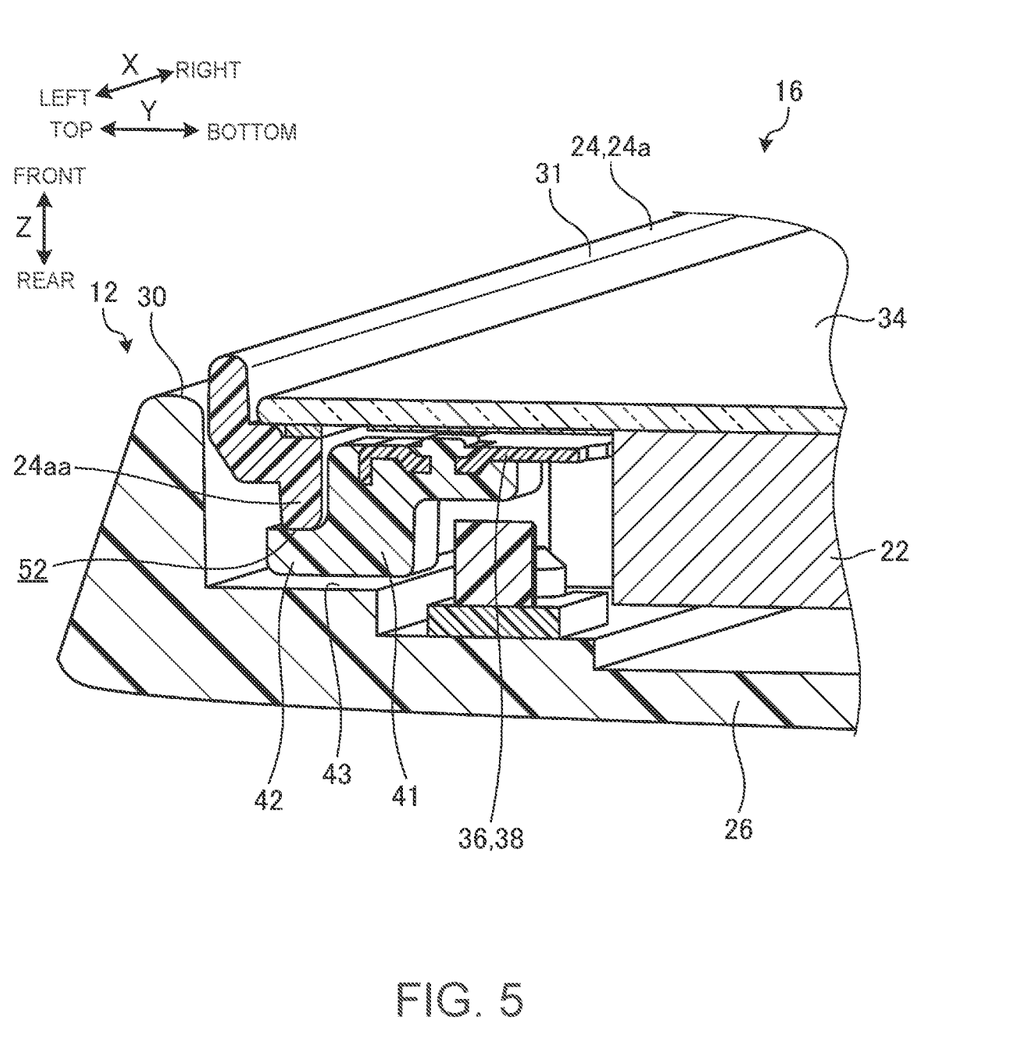
FIG. 5 is a cross-sectional perspective view of an upper portion of the display chassis including the second guide protrusion piece.

FIG. 5 is a cross-sectional perspective view of an upper portion of the display chassis 16 including the second guide protrusion piece 42. The rear face of the second slide piece 41 and the rear face of the second guide protrusion piece 42 define a continuous surface, and abut and slide on the bottom face 43. These rear faces of the second slide piece 41 and the second guide protrusion piece 42 have an appropriate area and thus allow the slider 36 to be stably supported and slide relative to the rear cover 26.

A part of the upper frame 24a forms a protrusion piece 24aa protruding rearward. The protrusion piece 24aa and the bottom face 43 define a guide gap 52 therebetween. The second guide protrusion piece 42 fits into the guide gap 52. This configuration restricts the displacement of the slider 36 in Z direction and properly guides the slider 36 in X direction during sliding. In this way, the protrusion piece 24aa serves as a rail guide that guides the slider 36 in X direction. When the slider 36 is in the first position or the second position, the slider 36 is biased upward by the attraction action between the fixed magnet 56 and the movable magnet 54, which will be described later, so that the second guide protrusion piece 42 comes in contact with the edge wall 30 and is restricted in displacement upward to be stable. Note that the second guide protrusion piece 42 is not restricted in downward displacement.

Referring back to FIG. 3 and FIG. 4, the arm 38b comes with the movable magnet 54 at the right end. A part of the arm 38b is bent to wrap the movable magnet 54 for holding (see also FIG. 7). The movable magnet 54 is of a square upper and lower double-sided multi-pole magnetized type, and is magnetized so that the N pole and the S pole are disposed from left to right on the upper side to have a two-pole configuration. The movable magnet 54 is magnetized so that the S pole and the N pole are disposed from left to right on the lower side. In each drawing of the present application, the N poles are represented with dots so that the polarity can be easily identified.

The upper frame 24a comes with the fixed magnet 56 at the portion above the range where the movable magnet 54 moves in X direction. That is, the fixed magnet 56 and the movable magnet 54 are placed side by side in Y direction, which suppresses the thickness of the display chassis 16 in Z direction.

Figure 7:
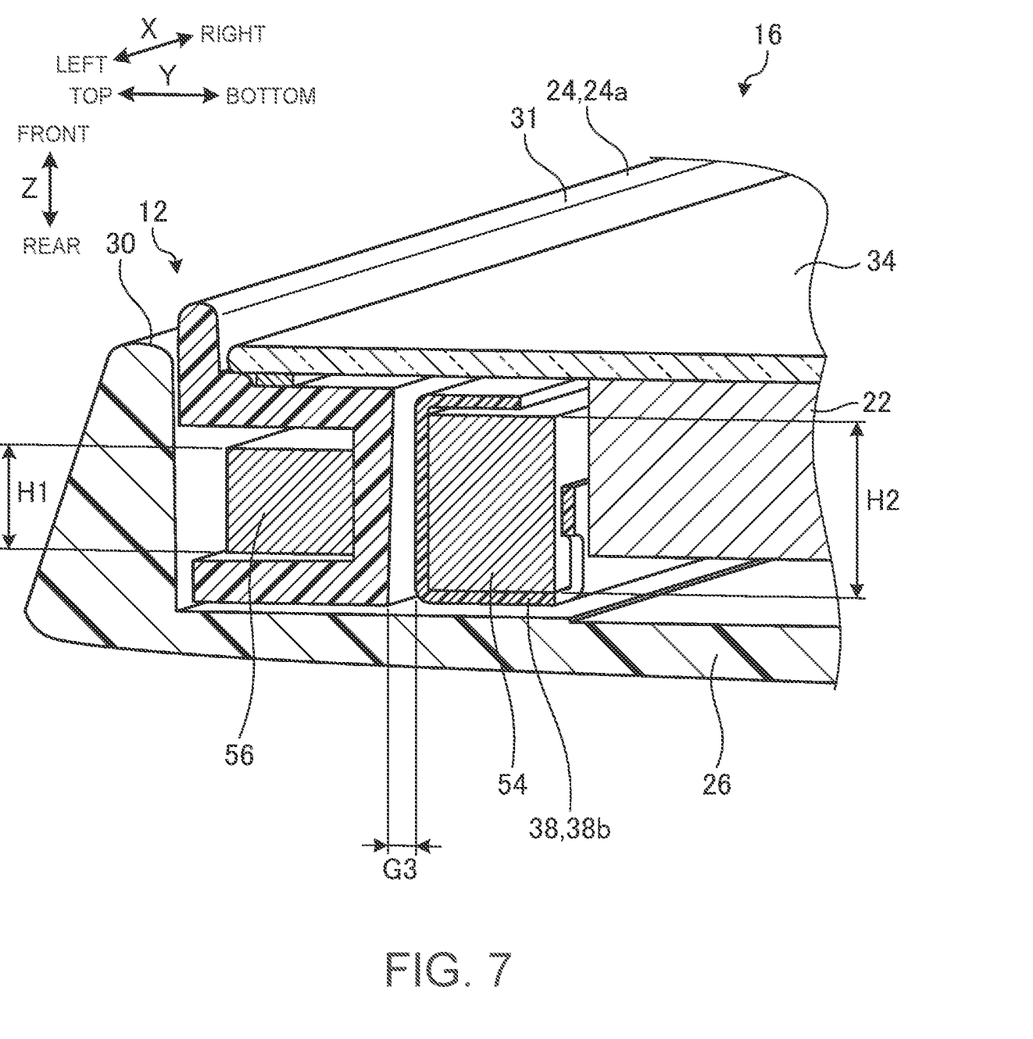
FIG. 7 is a cross-sectional perspective view of an upper portion of the display chassis including the fixed magnet and the movable magnet.

The fixed magnet 56 is held by a part of the upper frame 24a (see also FIG. 7). The fixed magnet 56 is of a square upper and lower double-sided multi-pole magnetized type, and is magnetized so that the S pole, the N pole, the S pole, and the N pole are disposed from left to right on the lower side to have a four-pole configuration. The fixed magnet 56 is magnetized so that the N pole, the S pole, the N pole, and the S pole are disposed from left to right on the upper side.

In other words, the movable magnet 54 has two poles of the N-pole and the S-pole in total disposed in X-direction on the face opposed to the fixed magnet 56, and the fixed magnet 56 has four poles of the N-poles and the S-poles in total alternately disposed in X-direction on the face opposed to the movable magnet 54. The movable magnet 54 has two fewer poles than the fixed magnet 56.

Figure 11:
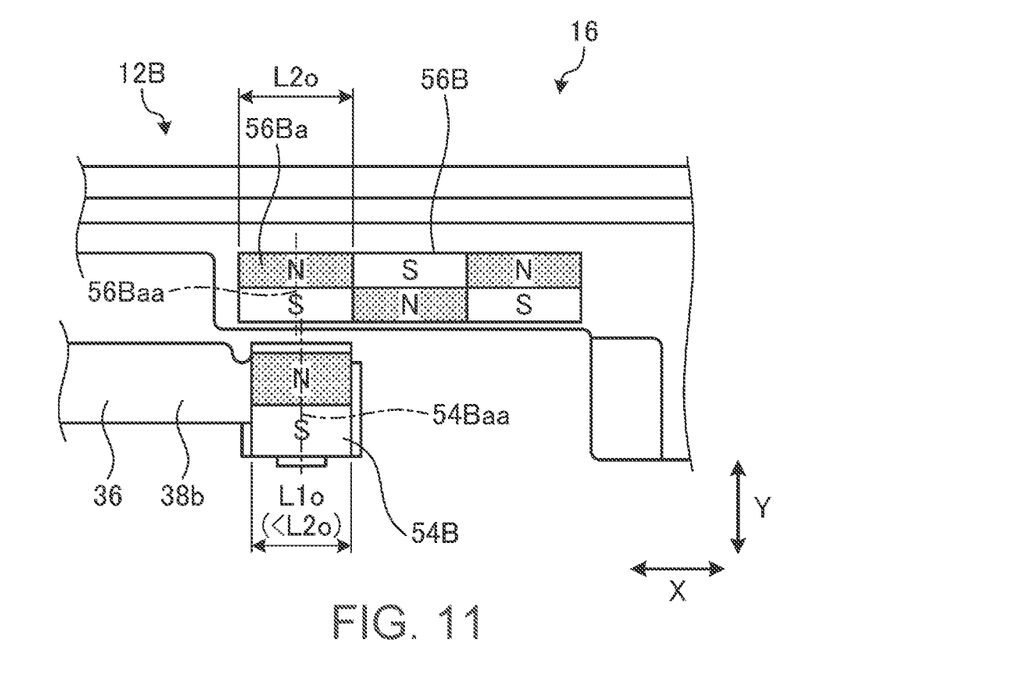
FIG. 11 is an enlarged front view of the upper frame when the slider of the slide mechanism is in the first position.

The number of the poles of the movable magnet 54 and the fixed magnet 56 is not limited to this example (see FIG. 11). Note that the configuration with the fixed magnet having four poles and the movable magnet having two poles suppresses the dimensions in X direction appropriately. Moreover, the experiment by the present inventor(s) confirmed that the attractive and repulsive forces of the movable magnet 54 and the fixed magnet 56 with this configuration were appropriately generated for stable and reliable operation.

The movable magnet 54 may be a single magnet to reduce the number of the components, or may include two magnets 54a and 54b disposed side by side in X direction. For convenience of explanation, the following assumes the example having two magnets 54a and 54b. The fixed magnet 56 may be a single magnet to reduce the number of the components, or may include four magnets 56a, 56b, 56c, and 56d disposed in X direction. For convenience of explanation, the following assumes the example having four magnets 56a to 56d.

Figure 6A:
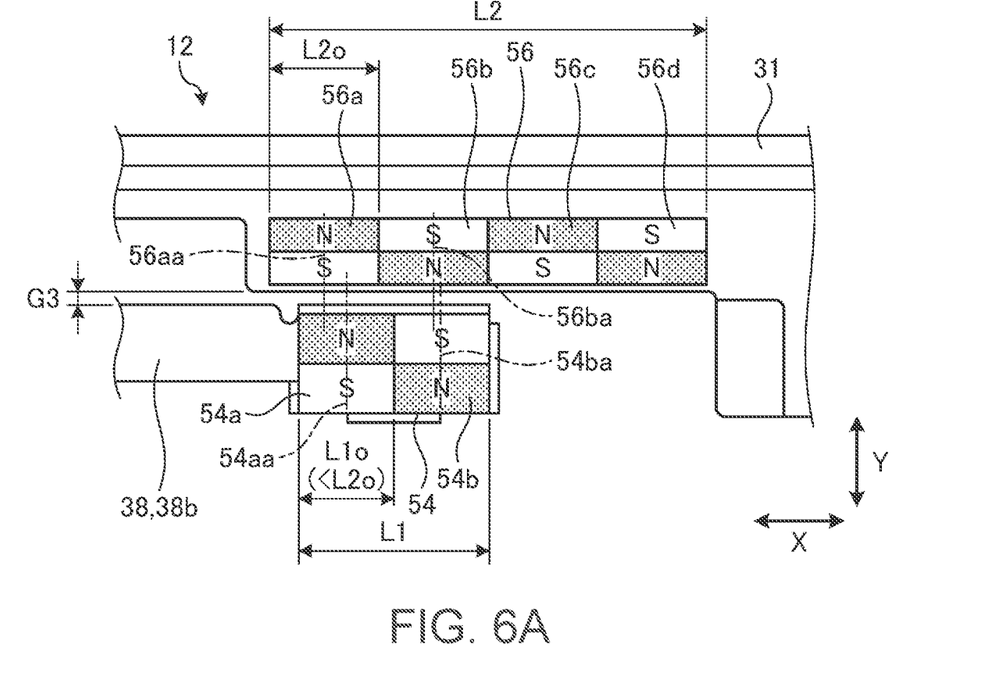
Figure 6B:
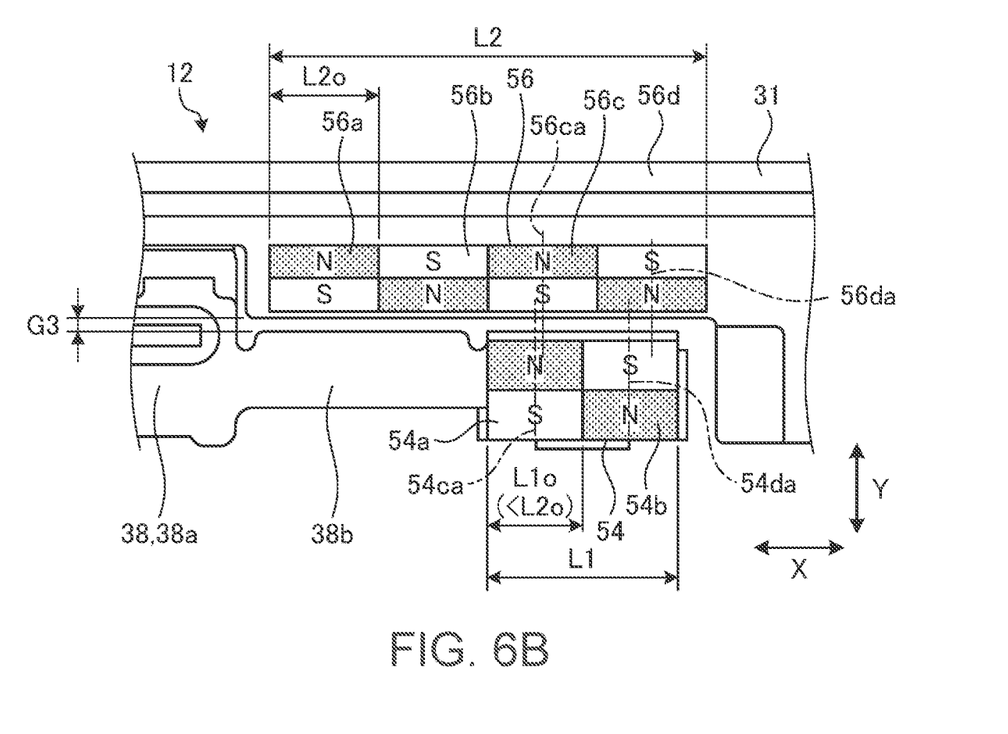

FIGS. 6A-6B illustrate the movable magnet 54, the fixed magnet 56 and their peripheral, where FIG. 6A illustrates them when the slider 36 is in the first position, and FIG. 6B illustrates them when the slider 36 is in the second position.

As illustrated in FIG. 6A, when the slider 36 is in the first position, the movable magnet 54 and the fixed magnet 56 are placed so that different poles face each other and attract each other. Specifically, the N pole of the magnet 54a and the S pole of the magnet 56a face each other and the S pole of the magnet 54b and the N pole of the magnet 56b face each other to attract each other. This keeps the slider 36 in the first position.

When the slider 36 is in the first position, the center line 54aa of the magnet 54a is slightly shifted to the right in X direction from the center line 56aa of the magnet 56a, and the center line 54ba of the magnet 54b is slightly shifted to the right in X direction from the center line 56ba of the magnet 56b. With this configuration, the movable magnet 54 and the left half of the fixed magnet 56 are attracted to each other in Y direction, and the slider 36 is biased to the left in X direction so that the operation knob 32 of the slider 36 is pressed against the first contact portion 31aa.

As illustrated in FIG. 6B, when the slider 36 is in the second position, the movable magnet 54 and the fixed magnet 56 are placed so that different poles face each other and attract each other. Specifically, the N pole of the magnet 54a and the S pole of the magnet 56c face each other and the S pole of the magnet 54b and the N pole of the magnet 56b face each other to attract each other. This keeps the slider 36 in the second position.

When the slider 36 is in the second position, the center line 54ca is slightly shifted to the left in X direction from the center line 56ca of the fixed magnet 56c, and the center line 54da is slightly shifted to the left in X direction from the center line 56da of the fixed magnet 56d. With this configuration, the movable magnet 54 and the right half of the fixed magnet 56 are attracted to each other in Y direction, and the slider 36 is biased to the right in X direction so that the operation knob 32 of the slider 36 is pressed against the second contact portion 31ab.

The movable magnet 54 and the fixed magnet 56 are always separated from each other, and a narrow gap G3 is formed therebetween when the slider 36 is in the first or second position (see also FIG. 7). This gap acts to bias the slider 36 to be attracted upward by the movable magnet 56, and to press the second guide protrusion piece 42 against the edge wall 30 (see FIG. 5). Appropriately setting the gap G3 keeps the movable magnet 54 and the fixed magnet 56 to be separated from each other even if there is some dimensional error or vibrations during operation.

In this way, when the slider 36 is in the first position or the second position, the operation knob 32 comes in contact with the first contact portion 31aa or the second contact portion 31ab without a gap, and the second guide protrusion piece 42 comes in contact with the edge wall 30 without a gap. The operation knob 32 and the second guide protrusion piece 42 are also appropriately pressed against there to be stable without rattling in X and Y directions. This improves the usability of the apparatus.

Length L1 in X direction of the movable magnet 54 is slightly shorter than ½ of length L2 in X direction of the fixed magnet 56. This means that since the movable magnet 54 has two poles and the fixed magnet has four poles, width $L1_0$ per pole of the movable magnet 54 is set to be slightly smaller than width $L2_0$ per pole of the fixed magnet 56. Such a relatively short length L1 of the movable magnet 54 keeps a long operating stroke. This also reduces the weight of the slider 36 that is a moving body, which improves the dynamic characteristics of the moving body. This further improves the degree of freedom in layout, and it is easy to place the center line 54*aa* for the slider 36 in the first position at a position shifted to the right of the center line 56*aa*, and place the center line 54*ca* for the slider 36 in the second position at a position shifted to the left of the center line 56*ca*.

FIG. 7 is a cross-sectional perspective view of an upper portion of the display chassis 16 including the fixed magnet 56 and the movable magnet 54. As described above, the fixed magnet 56 is held by the upper frame 24*a* of the resin material, and the movable magnet 54 is held by the arm 38*b* of the ferrite material. The display chassis 16 is thin, and the upper frame 24*a* is made of a resin material and needs to have an appropriate thickness from the viewpoint of strength and molding conditions. The fixed magnet 56 therefore has width H1 in Z direction that is slightly narrow due to these restrictions. The arm 38*b* is made of a ferrite material that is a metal plate, and can be made thin while maintaining its strength. The movable magnet 54 is therefore allowed to have an appropriately large width H2 (H2>H1). That is, while width H1 of the fixed magnet 56 is somewhat small, width H2 of the movable magnet 54 is set to be somewhat large. This keeps the magnetic force (attraction and repulsive forces) between these magnets appropriately large.

The movable magnet 54 has ferrite on the non-attracting face opposite to the attracting face. This prevents magnetic leakage to the non-attracting face while guiding the magnetic flux to the attracting face to increase the magnetic flux density on the attracting face. This increases the attracting force of the movable magnet 54 and provides better feeling. The ferrite material is magnetically attracted, and is attracted to the movable magnet 54 during assembly, which facilitates the assembly.

Next, the following describes the action of the electronic apparatus 10 and the slide mechanism 12 having the above configuration.

As illustrated in FIG. 3, when the slider 36 is in the first position, the first shield cover 46*a* covers the camera 28, and the second shield cover 46*b* covers the camera lamp 29. As described above, the slider 36 is kept in the first position by the attractive action between the movable magnet 54 and the fixed magnet 56, and is biased to the left and upward so as not to rattle.

When the camera 28 is used, the user moves the operation knob 32 to the right until the slider 36 moves to the second position. For this operation, the gap G3 is kept between the movable magnet 54 and the fixed magnet 56. This prevents the slider 36 from generating unpleasant frictional resistance at least in this portion, so that the operation knob 32 starts to move smoothly. Note here that the movable magnet 54 and the fixed magnet 56 are attracted to each other at the first position, and this generates an appropriate magnetic resistance that the user feels to move the slider 36, and this resistance increases with the amount of movement.

Figure 8:
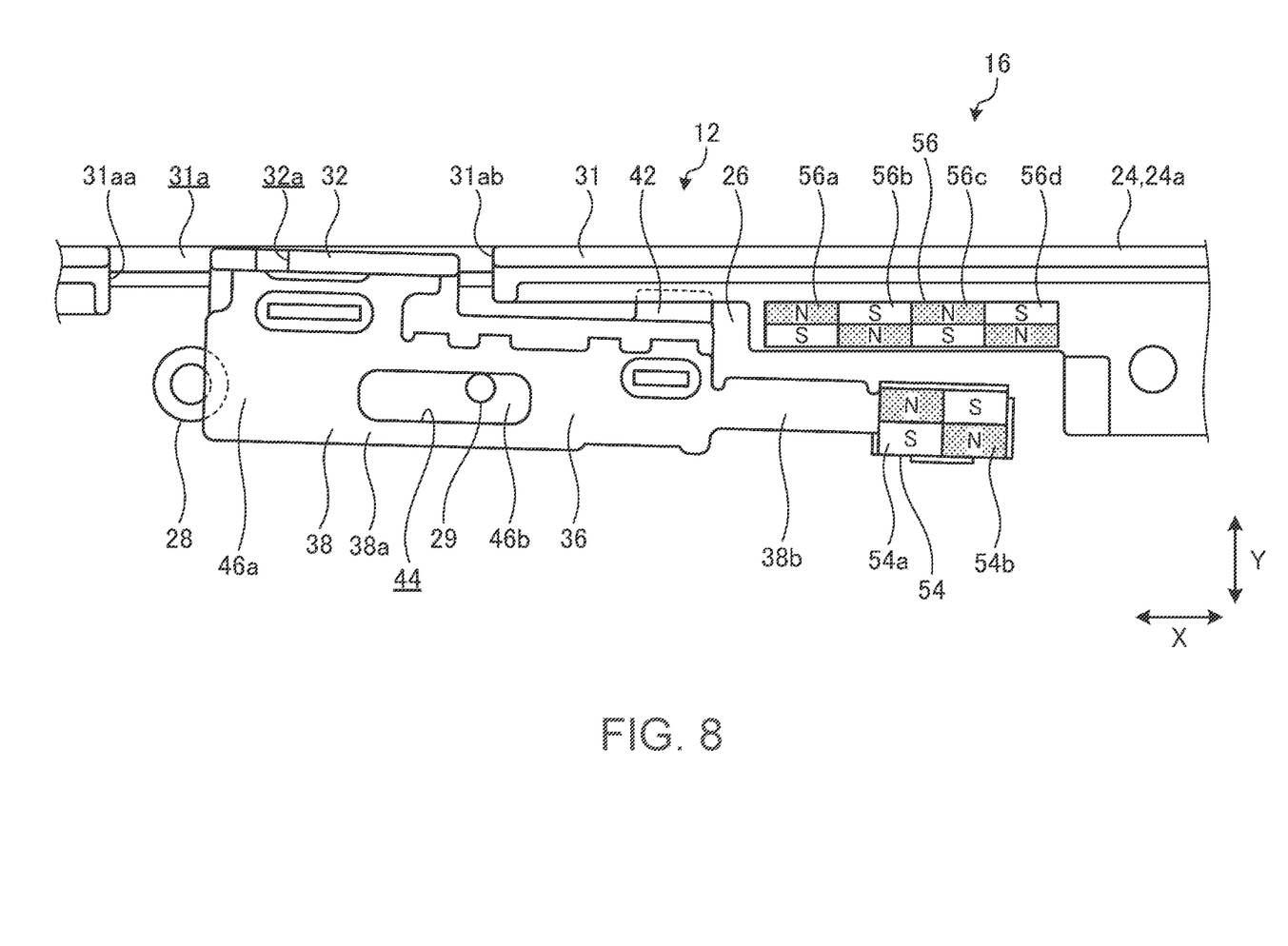
FIG. 8 is an enlarged front view of the upper frame in the display chassis when the user moves the slider.
Figure 9:
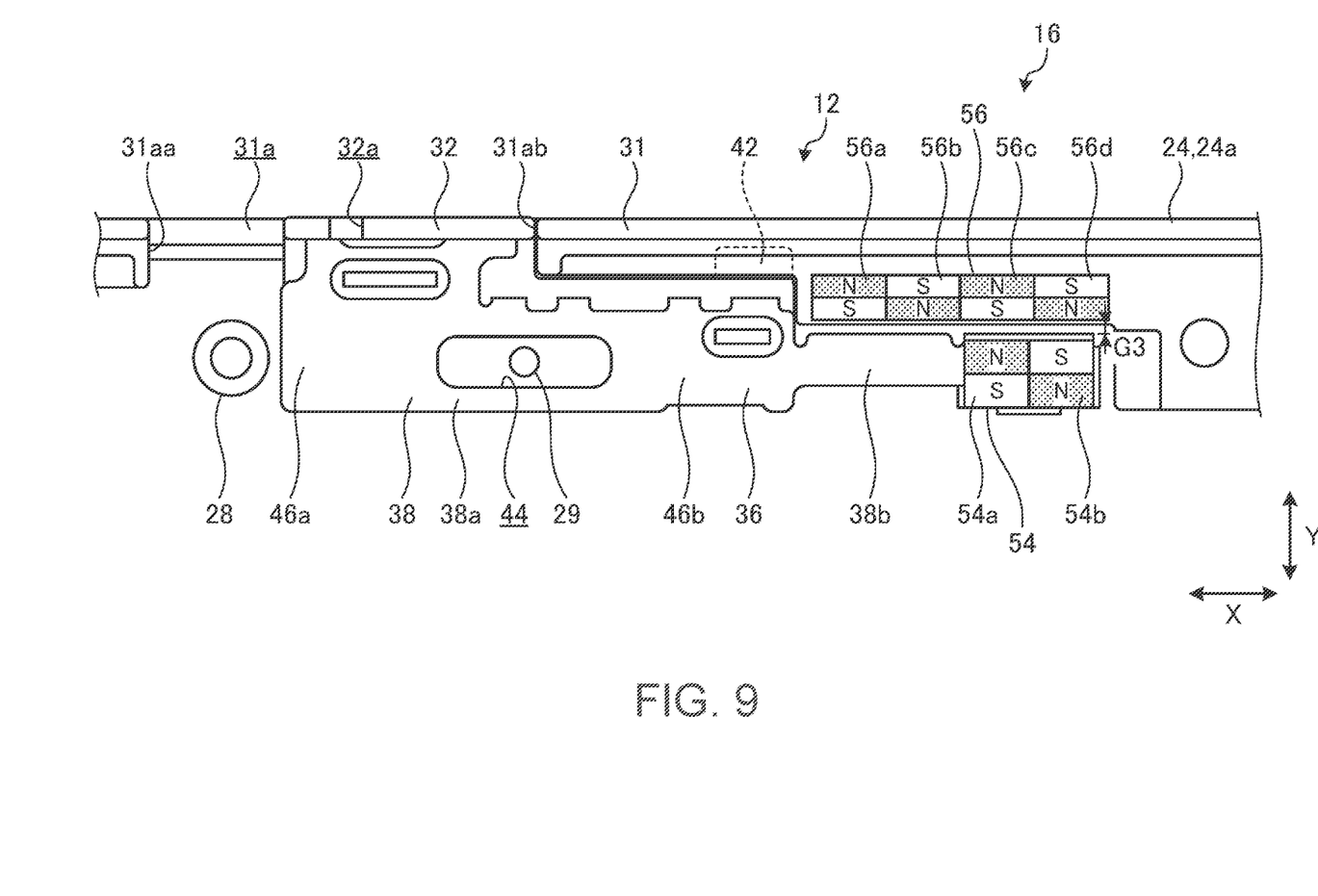
FIG. 9 is an enlarged front view of the upper frame in the display chassis when the slider is in the second position.

FIG. 8 is an enlarged front view of the upper frame 24*a* in the display chassis 16 when the user moves the slider 36. FIG. 9 is an enlarged front view of the upper frame 24*a* in the display chassis 16 when the slider 36 is in the second position.

As illustrated in FIG. 8, when the slider 36 is between the first position and the second position, the N pole of the magnet 54*a* and the N pole of the magnet 56*b* face each other, and the S pole of the magnet 54*b* and the S pole of the magnet 56*c* face each other. That is, the same poles face each other and repel each other. While sliding the slider 36 from the first position to the second position, the repulsive force between the movable magnet 54 and the fixed magnet 56 is the largest in the state in FIG. 8. If the user releases the operation knob 32 before reaching the state of FIG. 8, the slider 36 will return to the original first position. When the user further moves the operation knob 32 to the right from the state of FIG. 8, the N pole of the magnet 54*a* and the S pole of the magnet 56*c* then are attracted to each other, and the S pole of the magnet 54*b* and the N pole of the magnet 56*d* are attracted to each other, so that they automatically shift to the state of FIG. 9.

In other words, the operator feels that the direction of the force acting on the operation knob 32 reverses after the state of FIG. 8, and thus obtains an appropriate click feeling. Such an action of the slider 36 and the operation knob 32 using magnetism is just similar to the action based on the biasing force of the blade spring in Japanese Unexamined Patent Application Publication No. 2020-201886, and this enables the operation without any sense of discomfort.

As described above, a gap G1 is formed between the first guide protrusion piece 39 and the protrusion piece 47*a*, and a gap G2 is formed between the protrusion piece 47*a* and the first slide piece 40. The second guide protrusion piece 42 is not restricted in displacement downward. In this way, the slider 36 is allowed to tilt somewhat.

With this configuration, as illustrated in FIG. 8, when a repulsive force is generated between the movable magnet 54 and the fixed magnet 56, the arm 38*b* on the right of the slider 36 tilts starting from the main portion 38*a* on the left, so that the movable magnet 54 and the fixed magnet 56 are further separated from the above-mentioned gap G3. This mitigates the repulsive force acting between the movable magnet 54 and the fixed magnet 56 somewhat, and prevents excessive resistance to move the slider 36. This also prevents excessive friction generated between the first guide protrusion piece 39 (see FIG. 2) or the first slide piece 40 and the first guide groove 48 and the second guide groove 50. In the case of the operation knob having the mechanism including the blade spring as in Japanese Unexamined Patent Application Publication No. 2020-201886, the operation knob is slightly tilted by the action of the blade spring during the operation. The present embodiment also involves similar tilting, so that the user is allowed to operate the operation knob without any discomfort compared to the conventional mechanism.

As illustrated in FIG. 9, when the slider 36 is in the second position, the first shield cover 46*a* is positioned away from the front of the camera 28 and the second shield cover 46*b* is positioned away from the front of the camera lamp 29. The camera 28 and the camera lamp 29 then are exposed on the front, so that their functions as the optical devices become effective. As described above, the slider 36 is kept in the second position by the attractive action between the movable magnet 54 and the fixed magnet 56, and is biased to the right and upward so as not to rattle. Movement of the slider 36 from the second position to the first position is the reverse operation of the above, so the description thereof will be omitted.

For such electronic apparatus 10 and slide mechanism 12, when assembling the slider 36 to a predetermined position on the upper frame 24*a*, the operator simply fits the first guide protrusion piece 39 into the first guide groove 49 (see FIG. 2) and fits the second guide protrusion piece 42 into the guide gap 52 (see FIG. 5). The slider 36 is easy to assemble because it does not have weak points in terms of strength and there is no concern about the deformation. The slider 36 does not need to be as precise as a small blade spring, and a stable click feeling can be obtained from the slider 36 even if there is some variation in the precision of components. The magnetic force of the movable magnet 54 and the fixed magnet 56 generates the click feeling, and the configuration is free from the deformation due to repetition. Further, the magnets are free from wearing because the non-contact state is kept between the two magnets, and thus have a long lifespan. The movable magnet 54 and the fixed magnet 56 are separated from each other and do not slide, and it is not necessary to apply a lubricant such as grease.

Next, the slide mechanisms 12A to 12C according to modified examples will be described. For these slide mechanisms 12A to 12C, like numbers indicate like components in the slide mechanism 12 as stated above, and their detailed descriptions are omitted. The slide mechanisms 12A to 12C are applicable to the electronic apparatus 10.

Figure 10:
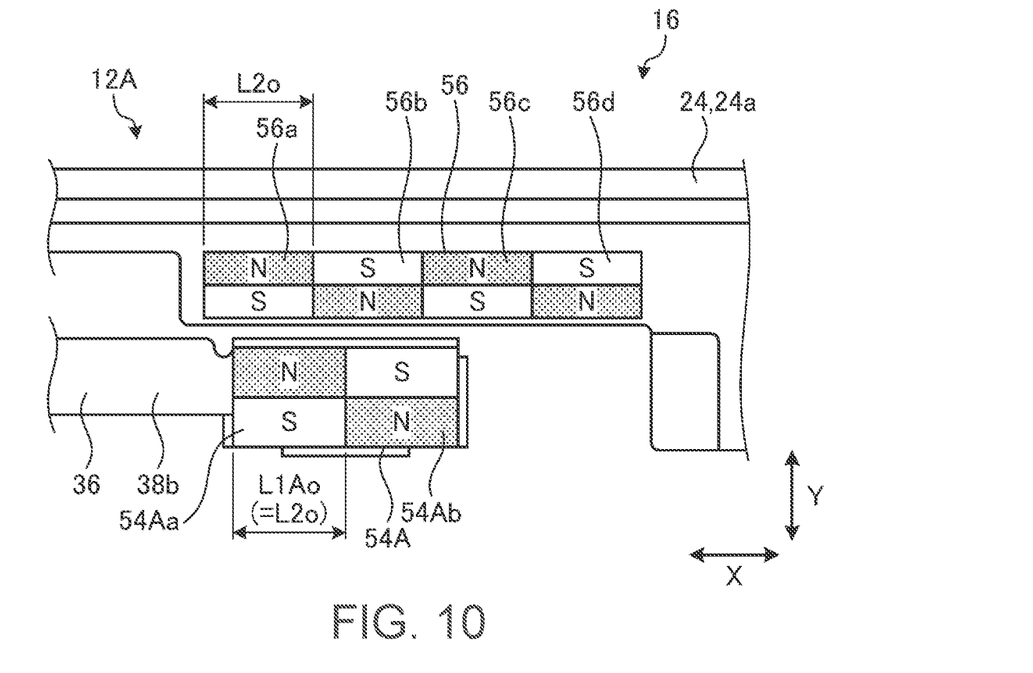
FIG. 10 is an enlarged front view of the upper frame when the slider of the slide mechanism is in the first position.

FIG. 10 is an enlarged front view of the upper frame 24a when the slider 36 of the slide mechanism 12A according to a first modified example is in the first position. The slide mechanism 12A includes a movable magnet 54A in place of the movable magnet 54 in the slider 36 described above. In this example, width $LA1_0$ per pole of the movable magnet 54A and width $L2_0$ per pole of the fixed magnet 56 are the same.

When the slider 36 is in the first position, the right end of the movable magnet 54A is located slightly to the right of the center of the fixed magnet 56. With this configuration, the movable magnet 54A and the left half of the fixed magnet 56 are attracted to each other in Y direction, and the slider 36 is biased to the left in X direction so that the operation knob 32 of the slider 36 is pressed against the first contact portion 31aa. In the slide mechanism 12A, when the slider 36 is in the second position, it acts symmetrically to the first position, which is not illustrated. When the slider 36 is located between the first position and the second position, the movable magnet 54A and the fixed magnet 56 repel each other.

FIG. 11 is an enlarged front view of the upper frame 24a when the slider 36 of the slide mechanism 12B according to a second modified example is in the first position. The slide mechanism 12B includes a movable magnet 54B and a fixed magnet 56B in place of the movable magnet 54 and the fixed magnet 56 in the slider 36 described above. The movable magnet 54B has a single N pole on the upper side. The fixed magnet 56B is magnetized so that the S pole, the N pole and the S pole are disposed from left to right on the lower side. That is, the fixed magnet 56B has a three-pole configuration on the lower side.

When the slider 36 is in the first position, the center line 54Baa of the movable magnet 54B is slightly shifted to the right in X direction from the center line 56Baa of the left magnet 56Ba in the fixed magnet 56B. With this configuration, the movable magnet 54A and the magnet 56Ba are attracted to each other in Y direction, and the slider 36 is biased to the left in X direction so that the operation knob 32 of the slider 36 is pressed against the first contact portion 31aa. When the slider 36 in the slide mechanism 12B is in the second position, it acts symmetrically to the first position, which is not illustrated. When the slider 36 is located between the first position and the second position, the movable magnet 54B and the fixed magnet 56B repel each other. In this way, the movable magnets 54 and 54B have two fewer poles than the fixed magnets 56 and 56B on the opposite faces. With this configuration, when the slider 36 is in the first position or in the second position, these magnets attract to each other, and when the slider 36 is located therebetween, the magnets repel each other.

Figure 12:
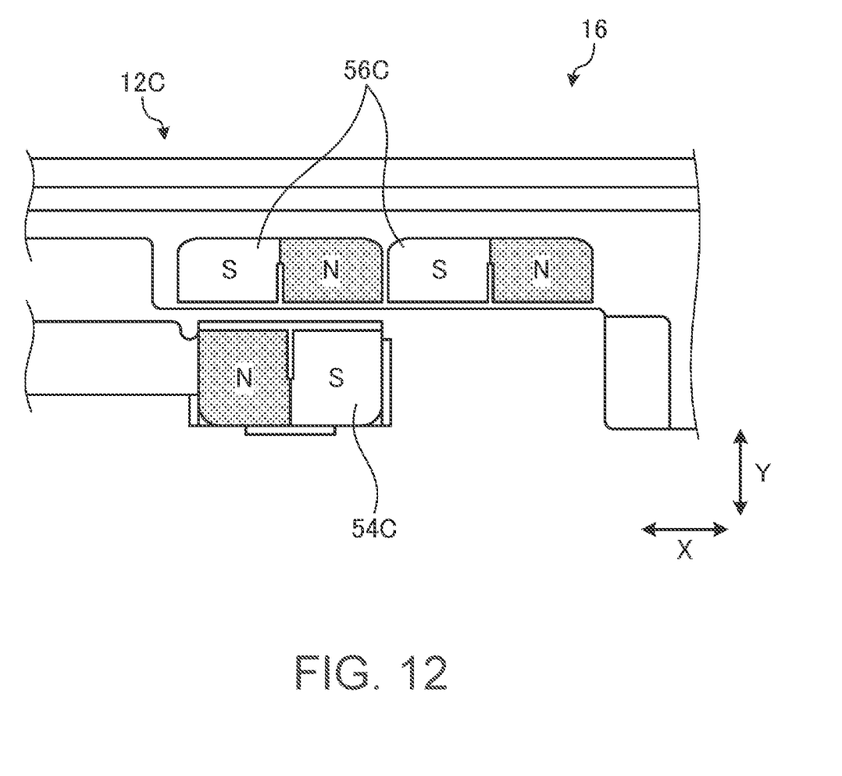
FIG. 12 is an enlarged front view of the upper frame when the slider of the slide mechanism is in the first position.

The slide mechanism 12C includes a movable magnet 54C and a fixed magnet 56C in place of the movable magnet 54 and the fixed magnet 56 in the slider 36 described above. The movable magnet 54C is one U-shaped magnet, and has magnetic poles on the upper face. The movable magnet 56C includes two U-shaped magnets 56Ca and 56Cb, which each have magnetic poles on the lower face. The movable magnet 54C and the fixed magnet 56C have the same arrangement of magnetic poles on the opposing faces as the movable magnet 54 and the fixed magnet 56 described above, but have no magnetic poles on the non-opposing face. Such a slide mechanism 12C has almost the same action as that of the above slide mechanism 12.

In the above-stated slide mechanisms, the movable magnet and the fixed magnet are relatively displaced. That is, a movable magnet having a smaller number of poles and a fixed magnet having a larger number of poles may be disposed in reverse. In other words, one of the fixed magnet 56 and the movable magnet 54 has three or more poles of N pole(s) and S pole(s) in total that are alternately disposed in X direction on the face opposing the other magnet, and the other of the fixed magnet 56 and the movable magnet 54 has two fewer poles than the number of magnetic poles of the one magnet that are disposed in the X direction on the face opposing the one magnet. The movable magnet 54 and the fixed magnet 56 then may be placed so that different poles face each other when the slider 36 is in the first position and the second position, and the same poles face each other when the slider 36 is located between the first position and the second position. Note here that the number of magnetic poles of the movable magnet on the slider 36, which is a moving body, may be reduced, which can keep the stroke longer and reduce the weight of the moving body. This improves the dynamic characteristics of the moving body.

The range of application of the above slide mechanism is not limited to the configuration that shields or exposes an optical device with a shield cover. This slide mechanism is applicable to a slide type switch, for example.

The present disclosure is not limited to the above-described embodiment, and can be modified freely without deviating from the scope of the present disclosure.

The invention claimed is:

1. An electronic apparatus comprising:
    a chassis having a display;
    an optical device in the chassis and in a facing forward direction;
    a slider that is movable between a first position and a second position relative to the chassis;
    a shield cover in the slider, the shield cover being configured to cover a front of the optical device when the slider is in the first position and configured to be away from the front of the optical device when the slider is in the second position;
    a movable magnet at the slider; and
    a fixed magnet at the chassis,
    the movable magnet and the fixed magnet face each other so that, when the slider is in the first position and the second position, the movable magnet and the fixed magnet attract each other, and when the slider is located between the first position and the second position, the movable magnet and the fixed magnet repel each other;
    a first contact portion configured to contact the slider located at the first position and to restrict a movement of the slider; and
    a second contact portion configured to contact the slider located at the second position and to restrict another movement of the slider,
    wherein
    the movable magnet and the fixed magnet are disposed so that N-poles on one of the magnets and S-poles on the other magnet are displaced in a moving direction of the slider and thereby press the slider in the first position against the first contact portion, and are disposed so that the N-poles on one of the magnets and the S-poles on the other magnet are displaced in the moving direction of the slider and thereby press the slider in the second position against the second contact portion.

2. The electronic apparatus according to claim 1, wherein one of the fixed magnet and the movable magnet has at least three magnetic poles of both N-poles and S-poles, the N-poles and the S-poles being alternately disposed along the moving direction of the slider and also being disposed on a face opposing the other magnet, the other of the fixed magnet and the movable magnet has two fewer magnetic poles than a number of the magnetic poles of the one magnet, the two fewer magnetic poles being disposed in the moving direction and also being disposed on another face opposing the one magnet, and the movable magnet and the fixed magnet are disposed so that magnetic poles on the movable and fixed magnets of opposite polarity face each other when the slider is in the first position and the second position, and magnetic poles on the movable and fixed magnets of the same polarity face each other when the slider is located between the first position and the second position.

3. The electronic apparatus according to claim 2, wherein the fixed magnet has four magnetic poles of each of N-poles and S-poles, the N-poles and the S-poles are alternately disposed in the moving direction of the slider, and also being disposed on the face opposing the movable magnet, and the movable magnet has one N-pole and one S-pole disposed in the moving direction, and also being disposed on the another face opposing the fixed magnet.

4. The electronic apparatus according to claim 1, wherein a width, in the moving direction of the slider, per magnetic pole of the movable magnet is smaller than a width, in the moving direction of the slider, per magnetic pole of the fixed magnet.

5. The electronic apparatus according to claim 1, wherein the fixed magnet and the movable magnet have a gap therebetween.

6. The electronic apparatus according to claim 1, further comprising:

a rail guide that guides the slider in the moving direction of the slider, wherein the slider and the rail guide have a gap in a direction orthogonal to the moving direction.

7. The electronic apparatus according to claim 1, wherein the fixed magnet and the movable magnet are disposed side by side in a direction orthogonal to the moving direction of the slider and a front-rear direction.

8. An electronic apparatus comprising:

a chassis having a display;

an optical device in the chassis and in a facing forward direction;

a slider that is movable between a first position and a second position relative to the chassis;

a shield cover in the slider, the shield cover being configured to cover a front of the optical device when the slider is in the first position and configured to be away from the front of the optical device when the slider is in the second position;

a movable magnet at the slider; and a fixed magnet at the chassis, the movable magnet and the fixed magnet face each other so that, when the slider is in the first position and the second position, the movable magnet and the fixed magnet attract each other, and when the slider is located between the first position and the second position, the movable magnet and the fixed magnet repel each other;

the fixed magnet is held by the chassis with a resin material, the movable magnet is held by the slider with a ferrite material, and the movable magnet has a width, in a front-rear direction, that is larger than a width in the front-rear direction, of the fixed magnet.

* * * * *